(12) United States Patent
Jernstrom et al.

(10) Patent No.: US 7,412,711 B2
(45) Date of Patent: Aug. 12, 2008

(54) STORAGE AND RETRIEVAL DEVICE FOR OPTICAL DISCS

(75) Inventors: Nana B. Jernstrom, Brighton (AU); Arjun Caprihan, St. Helena (AU)

(73) Assignee: Opdicom, Pty., Ltd., Boronia (AU)

( * ) Notice: Subject to any disclaimer, the term of this patent is extended or adjusted under 35 U.S.C. 154(b) by 735 days.

(21) Appl. No.: 10/882,841

(22) Filed: Jun. 30, 2004

(65) Prior Publication Data

US 2006/0005208 A1   Jan. 5, 2006

(51) Int. Cl.
  *G11B 7/085* (2006.01)
  *G11B 21/08* (2006.01)
(52) U.S. Cl. .......... 720/624; 720/621; 369/30.91; 369/30.45; 369/30.56; 369/30.44
(58) Field of Classification Search .......... 720/600
  See application file for complete search history.

(56) References Cited

U.S. PATENT DOCUMENTS

| | | | | |
|---|---|---|---|---|
| 4,628,498 A * | 12/1986 | Takamatsu et al. | .......... | 720/624 |
| 4,754,445 A | 6/1988 | Young et al. | | |
| 5,541,897 A * | 7/1996 | Baca et al. | .......... | 369/30.92 |
| 6,052,356 A * | 4/2000 | Fujimoto et al. | .......... | 369/30.9 |
| 6,226,253 B1 * | 5/2001 | Ogawa | .......... | 369/30.9 |
| 6,603,715 B1 * | 8/2003 | Klein | .......... | 369/30.86 |
| 6,680,882 B2 | 1/2004 | Ikedo et al. | | |
| 6,820,271 B2 * | 11/2004 | Schafer | .......... | 720/600 |
| 6,901,597 B2 * | 5/2005 | Leung | .......... | 720/600 |
| 6,957,440 B2 * | 10/2005 | Klein | .......... | 720/600 |
| 2002/0012294 A1 * | 1/2002 | Fukushima et al. | .......... | 369/30.86 |
| 2003/0090966 A1 | 5/2003 | Klein | | |
| 2003/0099182 A1 * | 5/2003 | Maeda et al. | .......... | 369/77.1 |
| 2005/0289570 A1 * | 12/2005 | Jernstrom et al. | .......... | 720/624 |
| 2006/0187771 A1 * | 8/2006 | Elbaum | .......... | 369/30.56 |

FOREIGN PATENT DOCUMENTS

| | | |
|---|---|---|
| WO | WO 02/097808 | 12/2002 |
| WO | WO 02/097808 A1 | 12/2002 |

* cited by examiner

*Primary Examiner*—William Korzuch
*Assistant Examiner*—Kezhen Shen
(74) *Attorney, Agent, or Firm*—Thelen Reid Brown Raysman & Steiner LLP (57) ABSTRACT

A device for storing optical discs is disclosed. The device includes a housing, a carousel arranged in the housing for movement relative to the housing, the carousel having a plurality of storage compartments each for storing a disc, an opening in the housing through which a disc can pass, drive means for driving the carousel relative to the housing to align each of the storage compartments and a disc stored in that storage compartment in registry with the opening, and an ejection system to eject a disc from a storage compartment and through the opening in said housing. The ejection system is powered by a motor and a clutch system, and control means is provided to cause said carousel to rotate and to cause the ejection system to operate as instructed by a user.

5 Claims, 10 Drawing Sheets

STORAGE AND RETRIEVAL DEVICE FOR OPTICAL DISCS

FIELD OF THE INVENTION

The present invention relates to computers and other electronic devices. More particularly, the present invention relates to a storage device for storing programmed or programmable media in disc form, such as a CD ROM, DVD or a music CD, which is to be used with a computer such as a personal computer or another device such as a DVD player or music CD player

BACKGROUND OF THE INVENTION

As is well known, information stored on DVD's, CD ROM discs, music compact discs and the like are commonly used with computers and audio and video equipment. Typically, such optical discs are stored in a storage rack or box and the receiving device includes an optical drive into which a disc is inserted.

Generally, in order to use an optical disc, the operator will insert the disc into the receiving device and initiate its operation.

However, before inserting the disc into the receiving device, the operator must manually locate the relevant optical disc and insert it into the optical disc reader of the receiving device. If the receiving device is a computer, the computer can then read and/or write onto the disc and run the program in accordance with the software contained on the CD ROM. If the receiving device is of another type, the device can interact with data or software contained on the disc under the control of software or data included in the receiving device.

The handling of optical discs, particularly if an operator has a large number of optical discs, can be time consuming and bothersome because of the number of optical discs which need to be stored and then the number which may have to be manually searched through in order to provide the data, file, or other information or material the operator wishes to access.

Figure 1:
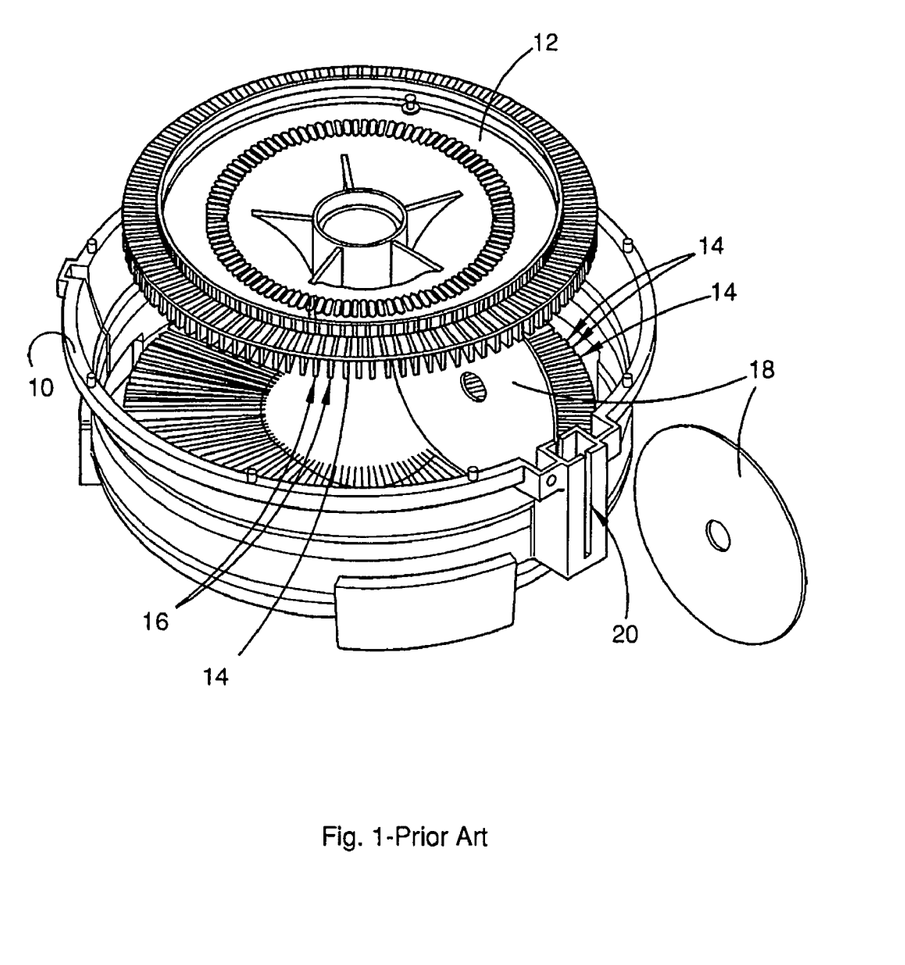
FIG. 1 is an exploded isometric view of an embodiment of a prior art device.

A CD storage device aimed at solving these problems is described in International Patent Application number PCT/AU01/00631, titled "CD ROM Storage Device" filed 28 May 2001 and published 5 Dec. 2002 under international Publication Number 02/097808 A1, by applicant Project Lab Pty Ltd. With reference to FIG. 1, the Project Lab application teaches a CD storage device which includes a case 10 in which a circular storage member 12 is supported for rotation in the case. The circular storage member 12 has a number compartments 14 formed between ribs 16 each for storing a CD 18. The device includes a controlling circuit board, not shown, which can couple with a computer so that CD's can be stored and retrieved by inputting information into the computer which causes the circular storage member to rotate to present the storage compartment having the required CD at an opening 20 for discharge. The device includes an ejector for ejecting CDs from a storage compartment 14. However, in some circumstances the ejector disclosed in the Project Lab patent application has shortcomings, and improvements to the ejector system are desirable.

BRIEF DESCRIPTION OF THE INVENTION

A device for storing optical discs is disclosed. The device includes a housing, a carousel arranged in the housing for movement relative to the housing, the carousel having a plurality of storage compartments each for storing a disc, an opening in the housing through which a disc can pass, drive means for driving the carousel relative to the housing to align each of the storage compartments and a disc stored in that storage compartment in registry with the opening, and an ejection system to eject a disc from a storage compartment and through the opening in said housing. The ejection system is powered by a motor and a clutch system, and control means is provided to cause the carousel to rotate and to cause said ejection system to operate as instructed by a user.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a storage and retrieval device for optical discs. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
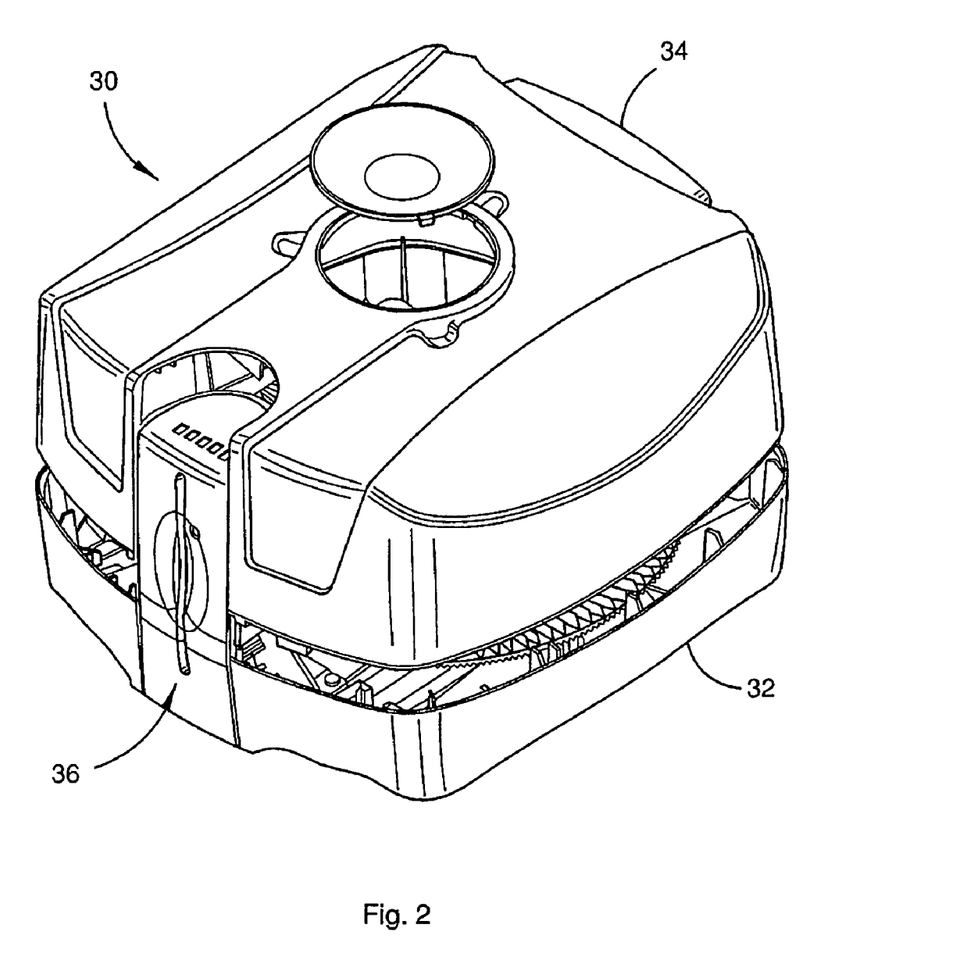
FIG. 2 is a partially exploded view of an embodiment of the present invention.

Turning now to FIG. 2 the present embodiment is shown in exploded form. The device includes a housing 30 which includes a housing base 32 and a housing cover 34, and an opening 36 is formed in the front of the housing 30 to permit CD's to be inserted into and removed from the device.

Figure 3:
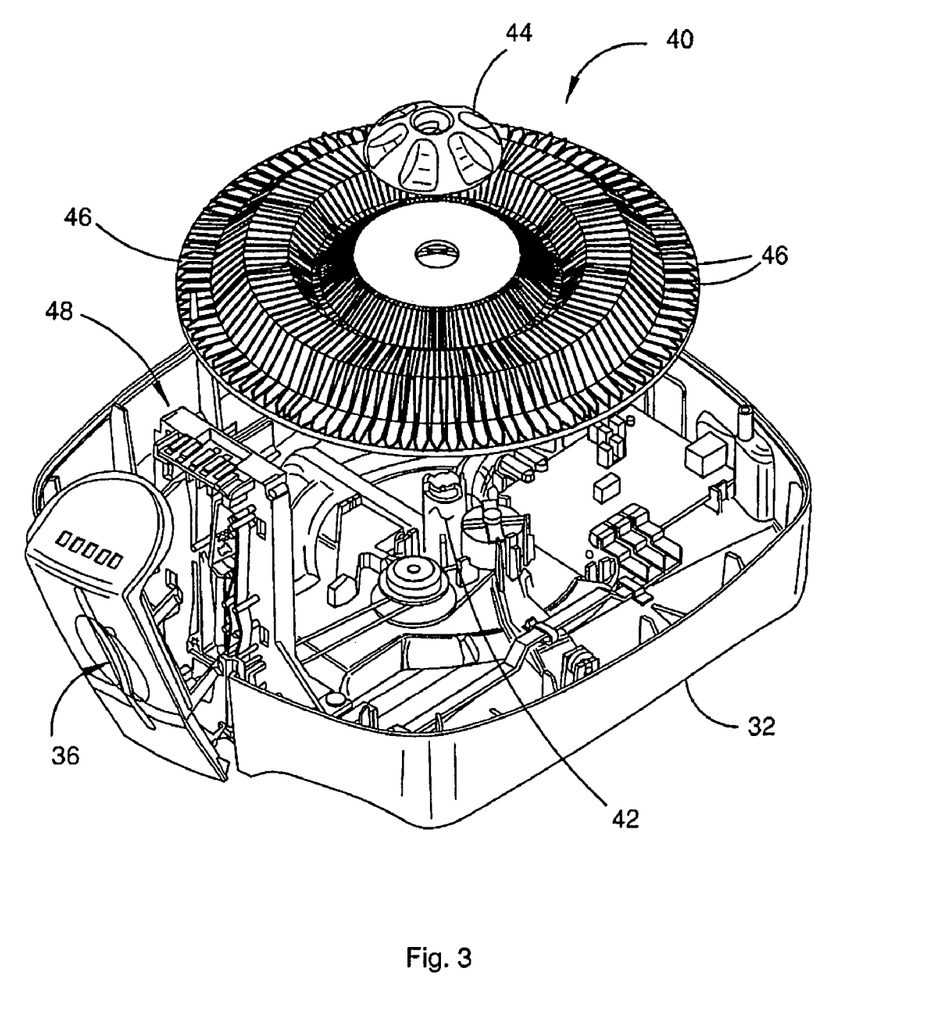
FIG. 3 is a partially exploded view of the embodiment of FIG. 1 with the top removed.

In FIG. 3 the device is shown with the housing cover 34 removed, and partially in exploded form. A carousel 40 is mounted for rotation on a post 42 located in the housing base 32, and a carousel cap 44 is mounted to the post 42 on top of the carousel to hold the carousel 40 in place. The carousel includes a plurality of slots 46 located radially around the carousel to hold discs, and the carousel is mounted to the post 42 so that the carousel can rotate. A carousel drive system, not shown, is mounted to the housing base 32 to controllably rotate the carousel 40, and a roller assembly 48 is mounted to the front side of the housing base 32.

Figure 4:
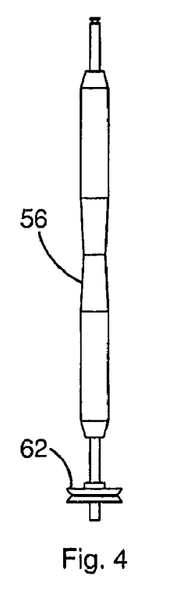
FIG. 4 is a view of a roller of an embodiment of the present invention.
Figure 5:
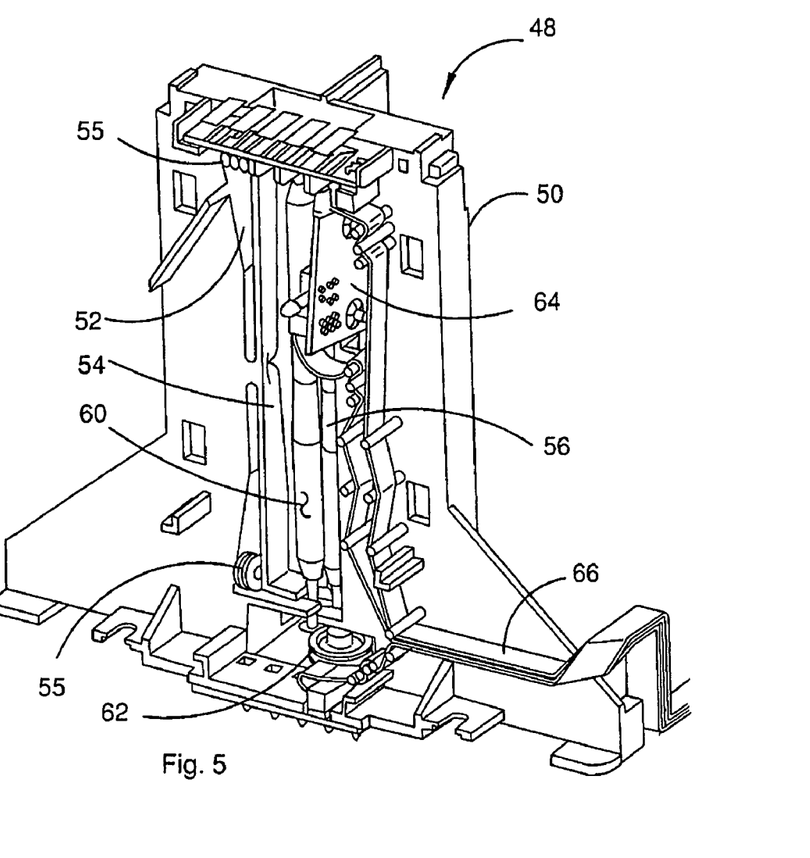
FIG. 5 is an isometric view of view of a roller system of an embodiment of the present invention.

Turning to FIGS. 4 and 5, the roller assembly 48 is shown comprising a chassis 50 with a vertically oriented slot 52 formed in the center. A roller mount 54 is located on one side of the slot 52, and roller 60 is rotatably connected to mount 54. A second roller mount, not shown, is connected to the opposite side of slot 52 and a second roller 56 is rotatably connected to the second roller mount. The second roller mount is solidly connected to the chassis 50, and roller mount 54 is coupled to a side of slot 52 by two springs 55 so that the roller 60 is biased toward roller 56. The rollers comprise a drive roller 56 and an idler roller 60 and the drive roller 56 has a roller pulley wheel 62 attached to its lower end. Thus, when the roller pulley wheel 62 is rotated, the drive roller 56 rotates which in turn causes the idler roller 60 to rotate, and if a disc is engaged between the rollers, the disc is moved either into or out of the device. A sensor PCB assembly 64 is connected to the chassis 50 to sense when a disc is entering or leaving the rollers, and electrical cable 66 is connected to the sensor PCB assembly 64 to convey signals to a control circuit, not shown.

Figure 6:
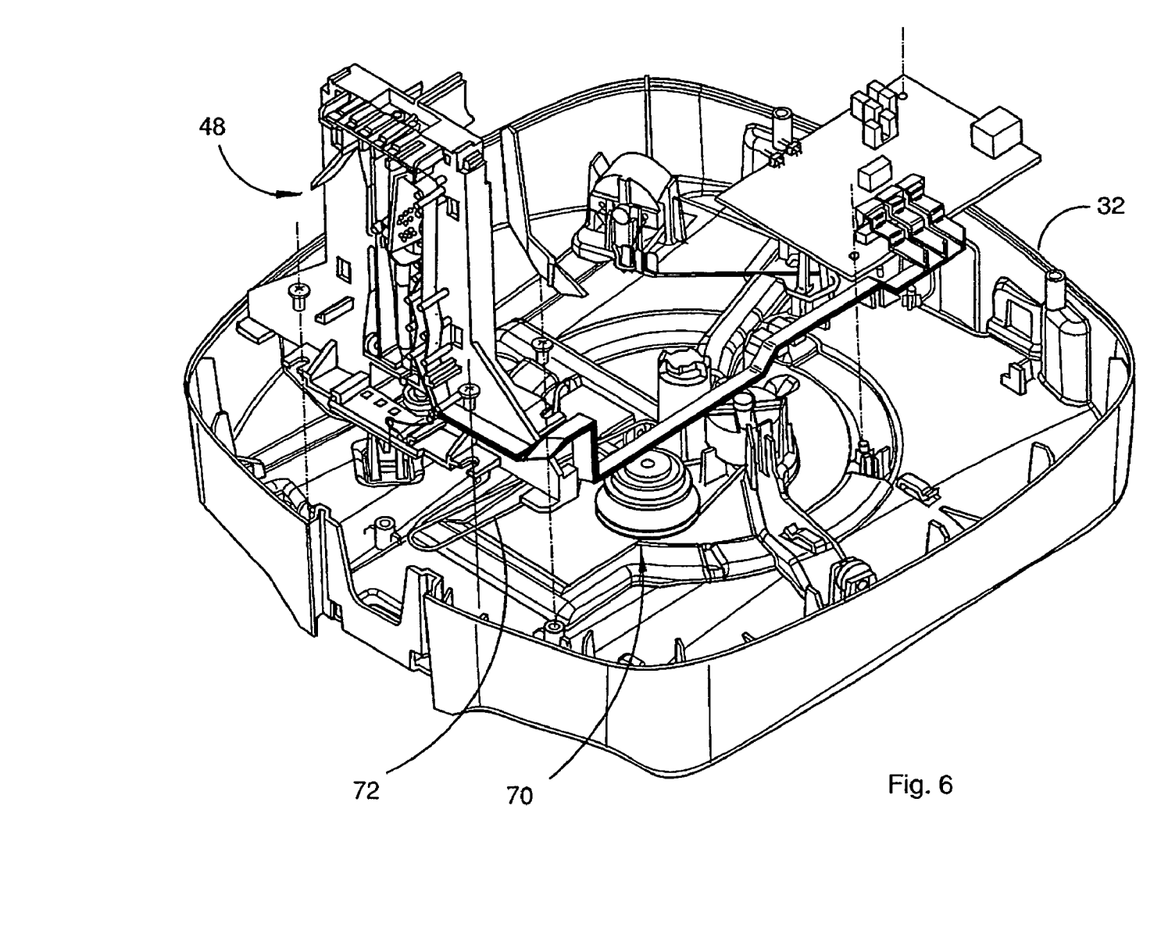
FIG. 6 is a partially exploded view of the embodiment of FIG. 1 with the top removed.
Figure 7:
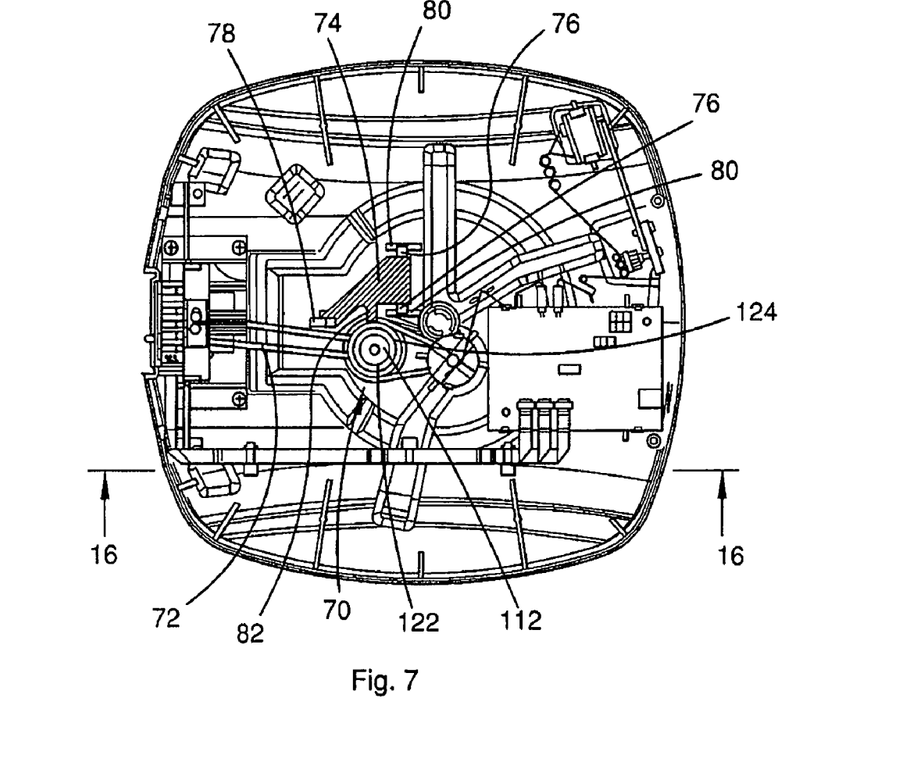
FIG. 7 is a top view of the embodiment of FIG. 1 with the top removed.
Figure 7A:
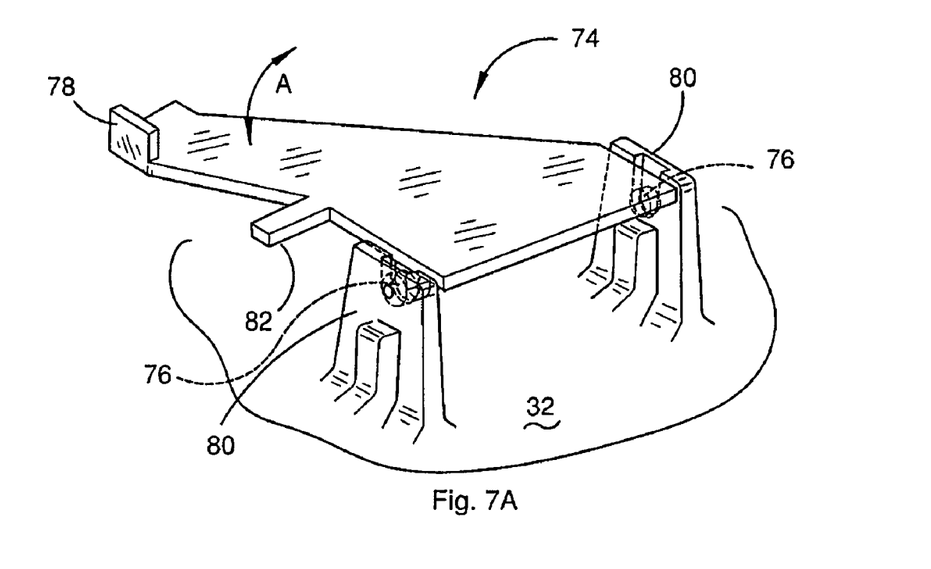
FIG. 7A is a perspective view of the ejector arm shown in FIG. 7
Figure 8:
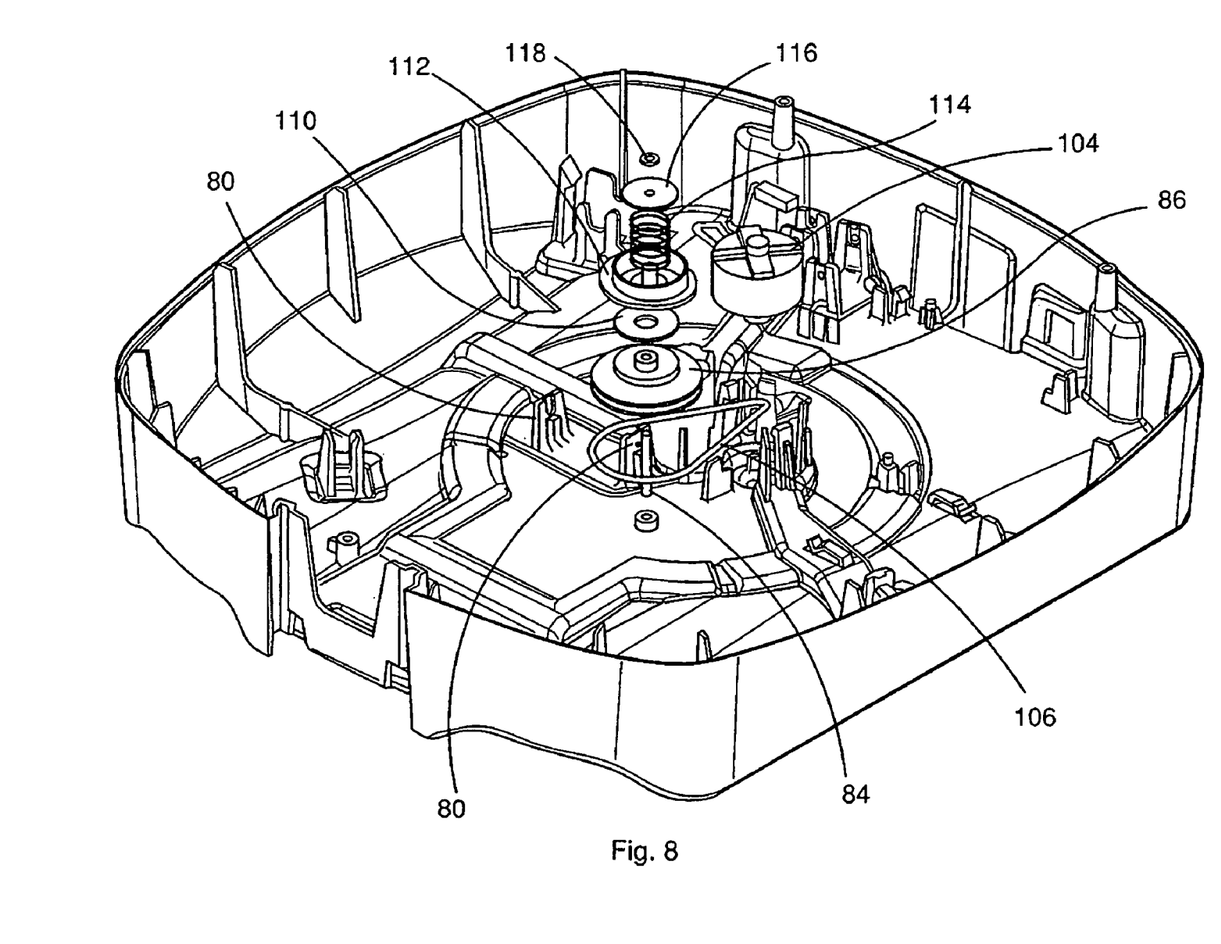
FIG. 8 is another partially exploded view of the embodiment of FIG. 1 with the top removed.

Turning now to FIGS. 6-8 a drive system 70 is shown mounted to the housing base 32, and the drive system 70 includes a roller drive belt 72, which is an endless belt having a square cross section. One end of the roller drive belt 72 is connected to the roller pulley wheel 62, and the other end is connected to the drive system 70. An ejector arm 74 is connected to the housing base 32, and the ejector arm 74 is driven by the drive system 70. As shown in FIG. 7A, the ejector arm 74 includes two posts 76 which are connected to form a hinge with posts 80, molded in the base 32, and the ejector arm 74 includes a lifting member 78 mounted at the end of the arm 74 opposite the posts 76. The ejector arm 74 also includes a follower 82 mounted between the lifting member 78 and the posts 76. Accordingly, when the follower 82 is moved up or down, the ejector arm 74 pivots about the hinges 80, and the lifting member 78 moves up and down as well.

Figure 9:
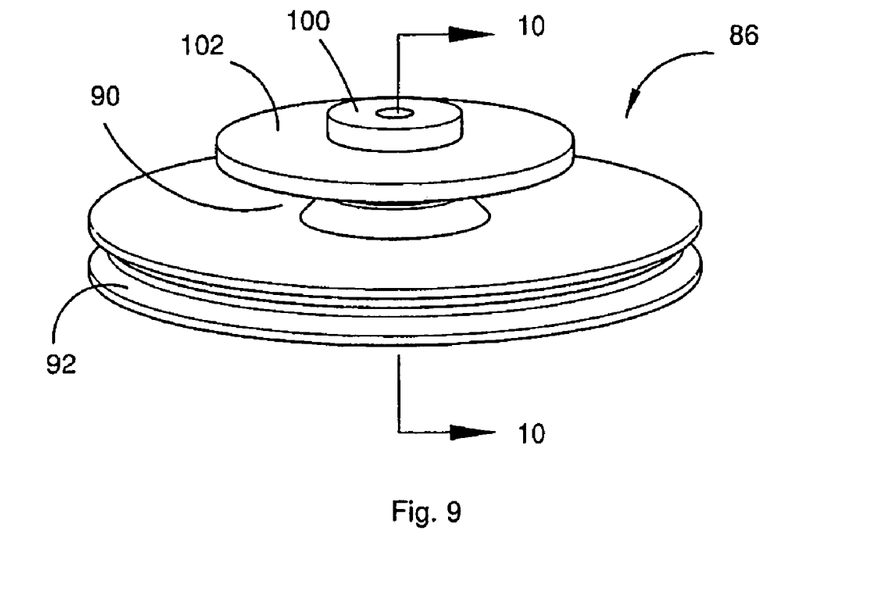
FIG. 9 is an isometric view of a pulley of an embodiment of the present invention.
Figure 10:
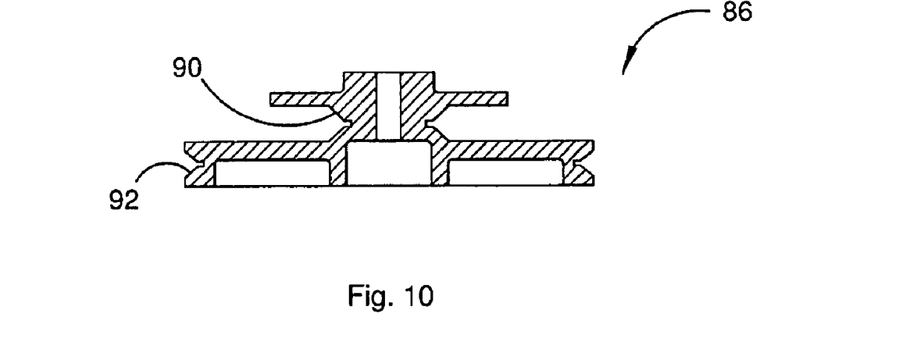
FIG. 10 is a cross section of the pulley of FIG. 9, taken along line 10-10.
Figure 11:
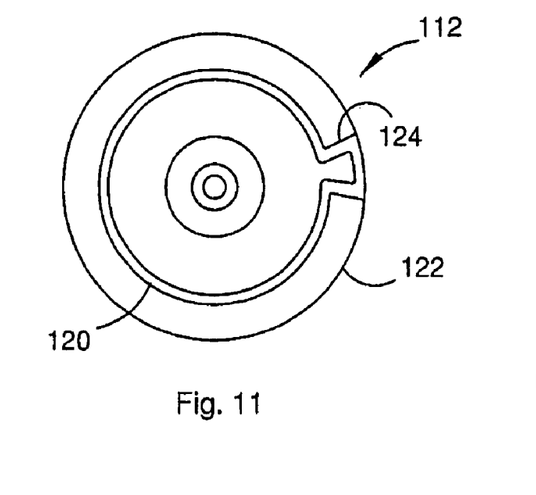
FIG. 11 is a top view of a cam of the present embodiment.
Figure 12:
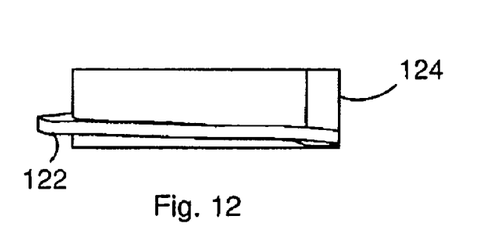
FIG. 12 is a side view of a cam of the present embodiment.
Figure 13:
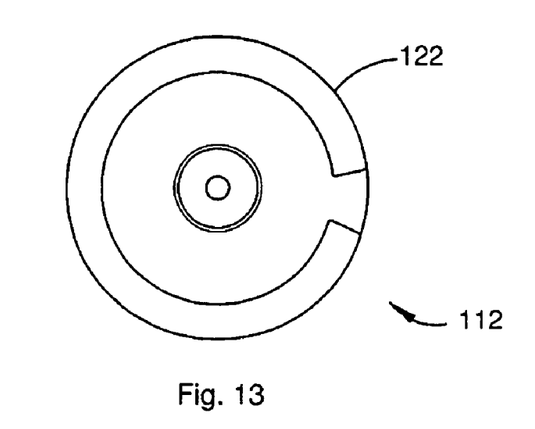
FIG. 13 is a bottom view of a cam of the present embodiment.
Figure 14:
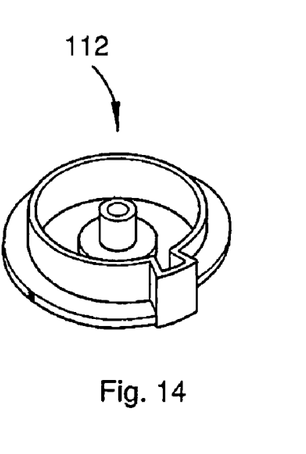
FIG. 14 is a top, isometric view of a cam of the present embodiment.
Figure 15:
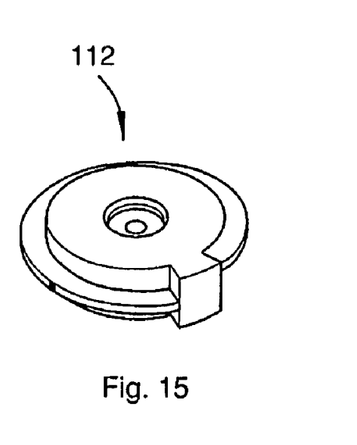
FIG. 15 is a bottom, isometric view of a cam of the present embodiment.

The ejection system also includes a clutch system which includes a clutch shaft 84 mounted to the housing base 32, and a clutch pulley 86 is mounted to the clutch shaft 84. As best shown in FIGS. 9 and 10, the clutch pulley 86 has an upper V-shaped section 90 and a lower V-shaped section 92. One belt runs in each of the V shaped sections 90 and 92. At the top of the clutch pulley 86 is a first disc 100 and below the first disc 100 is a second disc 102 which has a larger diameter than the first disc 94. A motor 104 is connected to the housing base 32, the shaft of the motor 104 is connected to a pulley drive belt 106, and the opposite end of the pulley drive belt 106 is located in the lower V-shaped section 92 of the clutch pulley 86. The roller drive belt 72 has one end located in the upper V-shaped section 90 of the clutch pulley 86, and the opposite end of the roller drive belt 72 is connected to the roller pulley wheel 62. Thus it can be understood that the motor 104 can drive the clutch pulley 86 to rotate which in turn drives the drive roller 56 to rotate.

On the top of the second disc 102 of the clutch pulley 86 is mounted a slipping washer 110 fabricated of a material with appropriate frictional characteristics. In the present embodiment, felt is the preferred material, although other materials could be used in appropriate circumstances. Above the slipping washer 110 is mounted a cam 112, a spring 114, a washer 116 and a retainer 118. The spring 114, washer 116 and retainer 118 are designed to provide downward force on the cam 112 to result in desired frictional relationship between the cam 112 and clutch pulley 86.

As best shown in FIGS. 11-15 the cam 112 includes a generally cylindrical, hollow body 120 which is closed at the bottom and open at the top, and a hole is formed in the top to accommodate the clutch shaft 84. A helical shelf 122 is affixed to the outer surface of the body 120. A stop 124 is affixed to the body and the stop 124 terminates the ends of the helical shelf 122.

Figure 16:
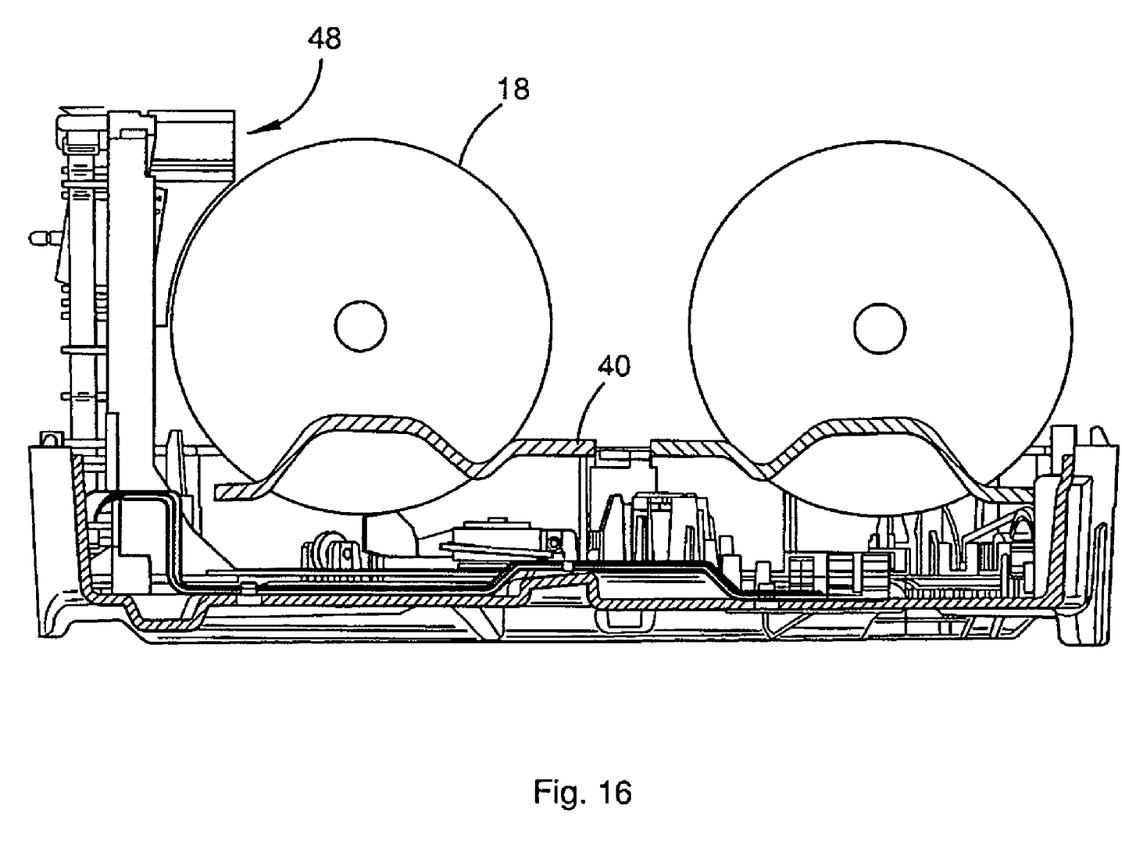
FIG. 16 is a cut away side view of the device of FIG. 7 taken along line 16-16.

The operation of the device can now be understood. Initially, optical discs are located inside the housing in slots 46 of the carousel 40. Each disc is supported by the carousel 40, and the carousel is constructed with slots so that part of the disc protrudes downward through the carousel 40 as illustrated in FIG. 16. At this time the cam 112 is in its most clockwise position so that the portion of the helical shelf 122 supporting the follower 82 is at its lowest position, and thus the lifting member 78 is at its lowest position, as illustrated in FIG. 16. At this time the lifting member 78 does not contact a disc 18. When the operator desires to eject a disc from the device, the operator instructs his computer to cause the device to operate so that the carousel 40 rotates and the desired disc is aligned with the opening 36 in the housing 30. Then the motor 104 operates so that its shaft rotates thereby causing the ejection system to operate, and the clutch pulley 86 and the cam 112 rotate. The rotation of the clutch pulley 86 causes the drive roller 56 to rotate although at this time no disc is between the rollers. Simultaneously, the cam 122 rotates in a counter-clockwise direction (as viewed from above) which raises the portion of the helical shelf which supports the follower 82, which in turn causes the lifting member 78 to rise and contact a disc thereby moving the disc upward and outward toward the roller assembly 48. Once the lifting member 78 has reached its maximum height, the disc has been engaged by the rollers. At this time the stop 124 of the cam 112 contacts the follower 82 and the cam 112 stops rotating. However, the motor 104 continues to operate and the clutch pulley 86 continues to rotate relative to the cam 112 because slippage occurs against the slipping washer 110. The clutch pulley 86 continues to rotate until the disc has been substantially ejected from the device by the rollers, at which time the sensor PCB assembly 64 senses the absence of a disc and the control system stops the motor 104. The disc is retained in the rollers to a small extent so that it does not fall but is easily removed by the operator pulling the disc forward the last small amount. Once the sensor board detects that the disc has been completely removed from the rollers the control system reverses the direction of the motor and resets the cam 122 to its most clockwise position so that the follower 82 is in its lowest position.

When a user inserts a disc, essentially the opposite process takes place. The sensor board detects a disc approaching the rollers which causes the rollers to rotate and move the disc into the carousel slot.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A device for storing optical discs, the device comprising:
   a housing;
   a carousel arranged in the housing for movement relative to the housing, the carousel having a plurality of storage compartments, each storage compartment configured to store a disc;
   an opening in the housing through which the disc can pass;
   a rotatable clutch;
   a roller system for moving an optical disc through the opening;
   a single motor for driving the carousel to align a storage compartment and a disc stored in that storage compartment in registry with the opening, for rotating the clutch and for rotating the roller system;
   a first belt coupled to the motor and the rotatable clutch for rotating the clutch;
   a second belt coupled to the rotatable clutch and the roller system for rotating the roller system;
   a cam on the rotatable clutch so that upon rotation of the rotatable clutch, the cam is rotated with the clutch and then is able to slip so that the rotatable clutch continues to rotate whilst the cam remains stationary;
   an ejection member pivotally mounted by a pivotal connection to the housing and having a cam engaging portion and an ejection portion, the cam having a helical shelf and the cam engaging portion engaging the shelf so that upon rotation of the cam, the helical shelf moves the ejection member about the pivotal connection to move the ejection portion into engagement with the disc to eject the disc from the storage location; and
   wherein the drive roller assembly is rotated prior to arrival of the disc at the drive roller assembly, and after movement of the engagement portion of the ejection member to eject the disc, the cam slips and remains stationary so that no further rotation is imparted to the cam but the second drive belt is moved to continue driving the roller assembly.

2. The device according to claim 1, wherein after ejection of the disc, the motor is reversed so as to return the cam and the ejection member to a starting position.

3. The device according to claim 2, wherein the cam includes stop members for limiting rotation of the cam, and a slip washer between the clutch and the cam to provide slippage of the cam relative to the rotatable clutch.

4. A device for storing optical discs, the device comprising:
   a moveable carousel having a plurality of storage compartments, each storage compartment configured to store a disc passing through an opening in communication with the carousel;
   a roller system configured to move an optical disc through the opening;
   a rotatable clutch;
   a motor for driving the carousel to align a selected storage compartment with an opening;
   a first belt coupled to the motor and the rotatable clutch, wherein the first belt is configured to rotate the clutch;
   a second belt coupled to the rotatable clutch and the roller system, wherein the second belt is configured to rotate the roller system;
   a cam coupled to the rotatable clutch and having a helical shelf, wherein the cam is configured to rotate upon rotation of the rotatable clutch, the cam capable of remaining stationary while the rotatable clutch rotates; and
   an ejection member pivotally coupled to the housing and having a cam engaging portion and an ejection portion, wherein the cam engaging portion engages the helical shelf and, upon movement of the cam, pivotably moves the ejection member to move the ejection portion into engagement with the disc to eject the disc from the storage compartment.

5. The device according to claim 4, wherein the roller system is rotated prior to passing of the disc to the roller system and after movement of the engagement portion of the ejection member to eject the disc, the cam remains stationary and the second drive belt is moved to continue rotating the roller system.

* * * * *